United States Patent [19]
Smith

[11] 3,913,530
[45] Oct. 21, 1975

[54] INSECTICIDE APPLICATOR FOR ANIMALS
[76] Inventor: A. E. Smith, R.R. 3, Smith Center, Kans. 66967
[22] Filed: June 17, 1974
[21] Appl. No.: 479,916

[52] U.S. Cl. ............................... 119/159; 119/157
[51] Int. Cl.² ......................................... A01K 29/00
[58] Field of Search ............................. 119/157, 159

[56] References Cited
UNITED STATES PATENTS
| | | | |
|---|---|---|---|
| 1,250,598 | 12/1917 | Langstaff | 222/500 X |
| 3,046,942 | 7/1962 | Hale | 119/157 |

FOREIGN PATENTS OR APPLICATIONS
| | | | |
|---|---|---|---|
| 638,775 | 3/1962 | Canada | 119/157 |

*Primary Examiner*—Robert Peshock
*Assistant Examiner*—Peter K. Skiff
*Attorney, Agent, or Firm*—C. B. Messenger

[57] ABSTRACT

Apparatus for the on-site storage and application of dust type insecticide and parasite treating materials to the hair and hides of animals. An applicator of flexible hollow tubular structure having exterior finger protrusions for aggressive contact with the animal's hide and hair is resiliently suspended between support standards. Valve elements on the applicator are moved by animal contact to selectively retain and release the treating materials. A supply of materials is stored at elevated position in a weather impervious storing and shipping bag that is interconnected to the applicator by a flexible conduit. Spring assisted movements of the applicator and conduit prevents bridging of the treating materials in the applicator, the supply conduit and the storage bag. The storage bag itself provides a dust-tight shipping container having a through channel at its upper end facilitating insertion of a support rod and a lower necked discharge opening adapted for engagement with said flexible conduit.

9 Claims, 4 Drawing Figures

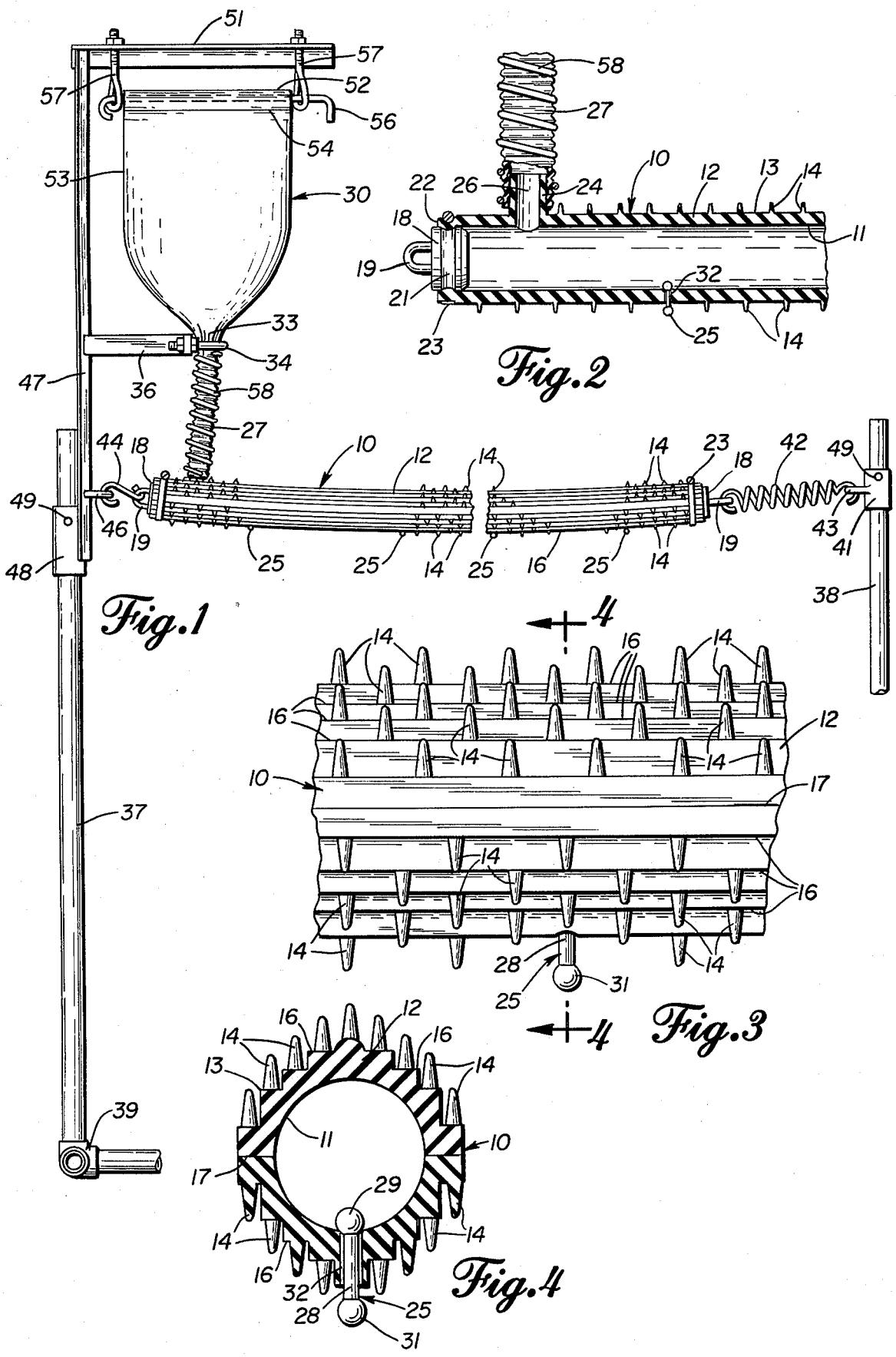

INSECTICIDE APPLICATOR FOR ANIMALS

BACKGROUND OF THE INVENTION

For many years it has been recognized that it is advantageous to protect animals from insect pests and parasites. Animals that are free of the annoyances and debilitating effect of such influences are healthier and, accordingly, more efficient from the standpoint of growth and production. So-called animal oilers have been used for many years in an effort to avoid at least some of these related problems, and more recently it has been recognized that the application of insecticide materials can improve the pest control aspects of herd management. While the dipping of animals in insecticide and parasite treating solutions is a worthwhile control procedure, some potential hazards and shortcomings are involved. More recently it has been found that insecticides can be provided in a mixture inclusive of a dust carrier. The sprinkling of dust type insecticide mixtures has seemingly made it possible to provide an improved pest control system, since the dust materials can be applied on a more or less regular basis. Bag systems filled with dust mixtures have been used in feed lots or barnyards at positions where the bags will be contacted by passing animals. A sprinkling of dust, inclusive of insecticide, is under such circumstances applied essentially to the face and backs of animals.

A major shortcoming of present dust type insecticide applicators is embodied in the fact that the hair of animals, such as that of cattle, hogs, sheep, etc., is quite tightly matted in a manner that essentially protects the animals' hide from wind and weather influences. This same matted protection, however, substantially prevents the ingress and movement of a dust product down to the animal hide that is the main target for the insect pests and parasites, and, accordingly, optimum results are not obtained if the dust-insecticide mixture iss merely spread or sprayed on the animal hair.

SUMMARY OF THE INVENTION

The present invention provides supply and storage elements for dust mixtures that include insecticides, etc., specifically formulated to attack and rid animals of various pests and parasites. The supply components are used together and cooperatively with applicator components that may be disposed in readily accessible positions about a barnyard or feedlot. An applicator of flexible tube type construction is used which has a plurality of nibs or fingers on its exterior surface positioned to engage and scratch at the hair of the animals' hide. Simultaneously the cooperative interengagement between the animal and the applicator activates a plurality of dispenser valves so that the dust mixture inclusive of the desired insecticide is distributed on the animals' hair to be worked toward contact with the hide itself due to the massaging action provided by the flexible nibs and fingers on the applicator. The applicator is of elongated tubular structure, and it is adapted to be extended by resilient elements between upright supports whereby an active movement pattern is assured for the applicator. The applicator and storage components are interconnected by a shielded flexible delivery conduit in such manner that movement of the applicator is transmitted to the conduit to agitate and dust materials in the delivery conduit and in the storage supply component to prevent bridging and blocking of such materials. Weighted valve elements are used to control the discharge of limited and somewhat pulsed quantities of dust materials from the applicator to prevent loss or use of excess amounts thereof. It is intended that the storage supply container for the dust materials will, in fact, be the sales or shipping container for such materials, and the storage component is, accordingly, made of a flexible, water impervious dusttight sheet material that will not leak in shipping and that will further prevent the ingress of moisture when used as a storage dispenser at outdoor locations.

BRIEF DESCRIPTION OF THE DRAWINGS

FIG. 1 is a partial side elevation with some parts shown in broken section,

FIG. 2 is a partial cross-sectional elevation taken adjacent the flexible delivery conduit, FIG. 3 is a partial side elevation showing the disposition of applicator nibs and fingers and a valving discharge element, and FIG. 4 is a cross-sectional elevation taken along the line 4—4 of FIG. 3 showing additional features of the applicator component of this invention.

DESCRIPTION OF THE PREFERRED EMBODIMENT

The overall features of the invention are shown in FIG. 1. From this illustration it is to be understood that the dust applicator apparatus of this invention is to be used in barnyards or feedlots or in other pens or areas where animals are confined. The applicator apparatus 10 is to be disposed at an elevated position for convenient contact with the animals that are to be treated. Since the animal will in essence activate the dust dispensing and the massaging or scratching operations, the applicator 10 should be in position where the animal can rub its body and hide thereagainst.

Applicator 10 is itself an elongated tube type structure that is preferably molded of a flexible and resilient material. The tube 12 of the applicator can, accordingly, be molded of rubber, urethane or other synthetic or compounded materials that can be conveniently molded. The mold form shape should provide an interiorly smooth hollow passage 11 and an exterior surface 13 of an overall corrugated type configuration. A plurality of nibs or activator fingers 14 are preferably disposed on the separate step surfaces 16 of the exterior shape 13. Desirably, the nibs 14 extend outwardly from the exterior surface 13 in directions that will assure direct contact with the hide and hair of the animal. Accordingly, a multipiece mold is desirably used to form the exterior surface 13 and its nibs 14. For the particular configuration shown, a two-piece exterior mold has been used, and a parting line 17 is, accordingly, disposed at a midpoint along the sides of the exterior surface 13 of applicator 10. In order to facilitate removal of a mandrel that provides the interior surface 11, one or both ends of the tube structure 12 is open. The open ends are closed by eye plugs 18 having a loop 19. Plugs 18 are of a diameter corresponding to the interior diameter of the central bore 11, and the plugs may be provided with a recess groove 21 about the exterior cylindrical surface thereof to assure a more secure engagement in the tube end 22 when the applicator 10 is assembled. A hose type clamp 23 is preferably extended about the exterior surface 13 of the applicator 10 and tightened at a position corresponding to the groove 21 to assure a tight interengagement between the plug 18 and the applicator tube structure 12. Plugs 18 of identical construction may be provided at each of the opposite ends for the applicator 10. An additional supply introduction opening is provided that connects into the interior 11 of the applicator component. An extension boss 24 disposed at one end of the applicator has a central passage 26 communicating with the interior of applicator 10. A flexible delivery hose or conduit 27 is interconnected to this upwardly disposed boss 24, and it is this flexible hose that delivers the dust insecticide mixture to the applicator. Dust materials thus introduced into the applicator are retained therein until the applicator is contacted and moved by an animal rubbing against the hair agitating exterior surface of the applicator.

In order to release the contained materials only when the applicator is being used, a plurality of valve components 25 are disposed in spaced positions along the length of the applicator. As shown in FIGS. 2 and 4, a dumb-bell shaped valve element 25 is beneficially used. Each valve 25 has a central shaft section 28 interconnecting two separate ball structures 29 and 31. The cross-section of the central shaft section 28 is of smaller size than the internal diameter of a dust release opening 32, while each of the balls 29 and 31 are of greater size than such discharge opening 32. If the lower exposed ball 31 is contacted by the animal and raised, a small quantity of dust insecticide materials will be allowed to escape through the passage 32 and past the central shaft 28. Since the dust product has an inherent bridging characteristic, only a limited quantity of materials will usually be released, and no continuous flow will be established by the ordinary animal contacts. If the upward pressure exerted on the lower ball 31 is greater than the weight of the valve 25, the flow through the passage 32 will actually be cut off by continued contact of the lower ball 31 with the lower exit shoulders forming the central discharge passage 32. In operation a pulsed type of dust discharge usually results. The size of the dumb-bell valves 25 is further coordinated with the size of the discharge openings 32, since these valve components are inserted after the applicator has been molded. The size of the openings 32 must be coordinated with respect to the size of the dumb-bell ends 29 and with respect to the resiliency of the material forming the body 12 for the applicators 10.

In order to assure an availability of dust materials for an extended period of time, it is desirable to provide a substantial quantity of dust materials in a storage container to be associated with the applicator. In keeping with the present embodiment of the invention, it has been found highly desirable to provide individual storage bags that may be joined directly to the flexible delivery hose 27 that is interconnected to the applicator 10. A storage supply bag 30 is shown in FIG. 1. This bag, which is formed of plastic or similar sheet materials, has a lower neck constriction 33 of reduced size so that the material of the neck 33 may be positioned directly about the delivery tube 27 to be held securely engaged to such tube by a clamp structure 34. The clamp 34 is of size and construction corresponding to that now used for exhaust clamps on automobiles. Clamp 34 is mounted on a support bracket 36, and, accordingly, the neck 33 of supply container 30 and the upper end of delivery hose 27 are held in somewhat fixed position.

Optimum use of the applicator and its attached supply components is assured when the applicator is extended between relatively rigid supports and, of course, when the applicator is at a height above the supporting ground for convenient engagement by the head and back, etc. of the animals to be treated. FIG. 1 partially illustrates the provision of upright support standards 37 and 38. Each of said support standards will have a supporting base 39 that may be provided by crossed sections of tubing. The standards 37 and 38 extend above their supporting bases. A slip collar 41 may be provided on the standard 38 so that it can be placed at various elevations above the supporting ground. A resilient member or spring 42 extends between the eye 19 of a plug 18, and a similar eye 43 provided by the slip collar 41. Preferably, the inlet end of the applicator 10 is more securely held. At this inlet end a hook 44 is used to interengage the eye 19 and an eye 46 on a standard extension 47. The standard extension 47 is welded or otherwise joined to an adjusting collar 48 having a set screw 49 so that the height of a bag supporting bracket 51 disposed outwardly from the extension 47 can be adjusted. The set screws 49 on the slide collars 41 and 48, of course, make it possible to adjust the operative height for the applicator 10 to correspond with the size of the animals to be treated. The elements engaging and holding the bag type storage supply container 30 are themselves designed to facilitate the removal of an empty bag and the replacement of a new full bag of dust insecticide materials. In the preferred embodiment the bags 30 are made of plastic materials of tube type construction. The upper end is terminated by a heat seal along the line 52. The edges 53 are opened adjacent the top heat seal 52, and, accordingly, a through passage is provided between the top and lower heat seal lines at 52 and 54. A support rod 56 is extended through the passage thus defined. Support rod 56 likewise can be extended through the eye bolts 57 to hold the upper end of the bag securely in position. As previously set forth, the lower end of the bag that is gathered and tightened about the supply delivery tube 27 is itself securely held in place by means of the bracket 36 and the clamp 34. The supply tube 27 itself, however, is flexible, and, accordingly, limited movements of this supply tube and even of the upper end of the applicator 10 adjacent the dust inlet boss 24 are possible. The resultant bouncing movement of this inlet end causes a type of pumping action in the interior of the flexible delivery tube 27 that prevents bridging of the dust materials in the supply tube and/or in the supply bag 30. A spring guard 58 is disposed about the exterior of flexible tube 27 that enhances this desired pumping action. This spring guard 58, however, has a further utilitarian purpose, inasmuch as it prevents the animals from biting and severing the flexible tube 27.

The flexible type mounting provided for the applicator and the flexible nature of the applicator and its supply conduit makes it possible for the unit to handle materials that may have an inherent tendency to bridge or ball up. The unit is, of course, primarily intended for outdoors use, and many dust materials will take up moisture from the atmosphere. Materials of this type may still be used in embodiments of the invention, since the flexible construction and mounting will tend to keep the materials separated and free flowing.

The applicator described can additionally be used for the application of medicated materials for the treatment of skin related or other diseases. For all uses the massaging action provided by the fingers and nibs assures movement of the treating materials directly to the skin. Materials are not simply deposited on top of the hair where they are subject to the losses of wind and weather. It is believed that the combined action of the moving applicator and the aggressive fingers materially contribute to the highly beneficial parasite and pest control results that have been obtained.

I claim:

1. Applicator apparatus for applying dust type insecticide and parasite treating materials to the hair and hide of animals comprising an elongated hollow tubular structure of flexible material, fastener means provided at the ends of said applicator tube structure to facilitate extension thereof between longitudinally spaced supports in a manner providing for resilient movement of said tubular structure, a plurality of finger protrusions provided by the flexible material of said tubular structure and extending outwardly from the exterior surface thereof, said tubular structure providing an inlet opening for the introduction of said dust type treating materials into the interior of said tubular structure and a plurality of exit openings disposed for gravity discharge of said treating materials therefrom, multiple position valve means for each of said exit openings, contact elements for each of said valve means purposefully exposed for animal contact whereby the treating materials are selectively released from an exit opening when the associated contact elements are engaged by the animal, an elevated storage supply container for said dust material, a flexible conduit interconnecting said supply container and the applicator tubular structure for the delivery of said treating materials to said tubular structure, and a resilient component for said applicator apparatus to increase the resilient movement thereof whereby flexing movements of said tubular structure will cause a corresponding movement of said conduit to disrupt bridging of said dust type treating materials and to assure the efficient flow and dispensing thereof.

2. The apparatus as set forth in claim 1 and further comprising a spring for said flexible conduit to facilitate the flexing movement thereof.

3. The apparatus as set forth in claim 2 wherein said spring is disposed exteriorly of said flexible conduit to additionally provide protection from animal misuses for the structure of said conduit.

4. The apparatus as set forth in claim 1 wherein each of said exit openings provides opposed valve seats disposed interiorally and exteriorally of said tubular structure and wherein each said valve means is inclusive of valve seat closure elements disposed interiorally and exteriorally of said tubular structure for selective mating engagement with said interior and exterior valve seats.

5. The apparatus as set forth in claim 4 and further comprising a shaft interconnecting said interior and exterior closure elements and of length whereby only one of said closure elements is in material controlling contact with a valve seat at any one time.

6. The apparatus as set forth in claim 5 wherein said animal contact elements for the valve means provide the exterior closure elements therefor.

7. The apparatus as set forth in claim 6 wherein said valve means inclusive of its interior and exterior closure elements, interconnecting shaft and animal contacts is a single piece structure of dumbbell shape and wherein the closure elements are of larger size than said exit openings and the interconnecting shaft is of smaller cross-sectional size than said exit openings with the resilience of said tubular structure permitting assembly of said valve means in said exit openings.

8. The apparatus as set forth in claim 1 and further comprising a plurality of stepped corrugations on the exterior surface of said tubular structure and wherein said finger protrusions extend outwardly from the stepped positions provided by said corrugations with all of said fingers being disposed parallel one to another.

9. The apparatus as set forth in claim 1 wherein said multiple position valve means have first gravity actuated closed positions, second contact force actuated closed positions and intermediate open positions with the selective release of said treating materials being provided when the contact elements are engaged by the animal to provide a contact force that permits movement of said valve means away from either closed position.

* * * * *